(12) United States Patent
Glasco

(10) Patent No.: US 7,103,726 B2
(45) Date of Patent: *Sep. 5, 2006

(54) METHODS AND APPARATUS FOR MANAGING PROBE REQUESTS

(75) Inventor: David B. Glasco, Austin, TX (US)

(73) Assignee: Newisys, Inc., Austin, TX (US)

( * ) Notice: Subject to any disclaimer, the term of this patent is extended or adjusted under 35 U.S.C. 154(b) by 123 days.

This patent is subject to a terminal disclaimer.

(21) Appl. No.: 10/288,399

(22) Filed: Nov. 4, 2002

(65) Prior Publication Data

US 2004/0088493 A1 May 6, 2004

(51) Int. Cl.
*G06F 12/14* (2006.01)
*G06F 15/173* (2006.01)

(52) U.S. Cl. ............... 711/141; 711/146; 711/152; 709/223

(58) Field of Classification Search ........... 711/141, 711/146
See application file for complete search history.

(56) References Cited

U.S. PATENT DOCUMENTS

| | | | | |
|---|---|---|---|---|
| 5,524,212 | A | * | 6/1996 | Somani et al. ............ 711/121 |
| 5,751,995 | A | * | 5/1998 | Sarangdhar ............... 711/145 |
| 5,774,700 | A | * | 6/1998 | Fisch et al. .............. 713/500 |
| 5,893,151 | A | * | 4/1999 | Merchant ................. 711/140 |
| 6,085,295 | A | | 7/2000 | Ekanadham et al. |
| 6,108,737 | A | | 8/2000 | Sharma et al. |
| 6,167,492 | A | | 12/2000 | Keller et al. ............. 711/154 |
| 6,189,078 | B1 | | 2/2001 | Bauman et al. |
| 6,209,065 | B1 | | 3/2001 | Van Doren et al. |
| 6,292,906 | B1 | | 9/2001 | Fu et al. |
| 6,385,705 | B1 | | 5/2002 | Keller et al. ............. 711/154 |
| 6,490,661 | B1 | | 12/2002 | Keller et al. ............. 711/150 |
| 6,631,447 | B1 | | 10/2003 | Morioka et al. |
| 6,636,906 | B1 | * | 10/2003 | Sharma et al. ............ 710/22 |
| 6,640,287 | B1 | | 10/2003 | Gharachorloo et al. |
| 6,658,526 | B1 | | 12/2003 | Nguyen et al. |
| 6,799,252 | B1 | * | 9/2004 | Bauman ................... 711/149 |
| 6,865,595 | B1 | * | 3/2005 | Glasco .................... 709/206 |
| 2001/0013089 | A1 | | 8/2001 | Weber-Wolf-Dietrich |
| 2002/0046327 | A1 | | 4/2002 | Gharachorloo et al. |
| 2002/0087807 | A1 | * | 7/2002 | Gharachorloo et al. ..... 711/141 |
| 2004/0255002 | A1 | | 12/2004 | Kota et al. |

OTHER PUBLICATIONS

Multicast snooping: a new coherence method using a multicast address networkBilir, E.E.; Dickson, R.M.; Ying Hu; Plakal, M.; Sorin, D.J.; Hill, M.D.; Wood, D.A.;Computer Architecture, 1999. Proceedings of the 26th International Symposium on, May 2-4, 1999.*

Bandwidth adaptive snoopingMartin, M.M.K.; Sorin, D.J.; Hill, M.D.; Wood, D.A.; High-Performance Computer Architecture, 2002. Proceedings. Eighth International Symposium on , Feb. 2-6, 2002; pp. 251-262.*

(Continued)

*Primary Examiner*—Brian R Peugh
(74) *Attorney, Agent, or Firm*—Beyer Weaver & Thomas, LLP

(57) ABSTRACT

According to the present invention, methods and apparatus are provided for increasing the efficiency of data access in a multiple processor, multiple cluster system. Mechanisms for reducing the number of transactions in a multiple cluster system are provided. In one example, memory controller filter information is used to probe a request or remote cluster while bypassing a home cluster memory controller.

20 Claims, 17 Drawing Sheets

OTHER PUBLICATIONS

Specifying and verifying a broadcast and a multicast snooping cache coherence protocolSorin, D.J.; Plakal, M.; Condon, A.E.; Hill, M.D.; Martin, M.M.K.; Wood, D.A.;Parallel and Distributed Systems, IEEE Transactions on , vol. 13 , Issue: 6 , Jun. 2002.*

*HyperTransport™ I/O Link Specification Revision 1.03*, HyperTransport™ Consortium, Oct. 10, 2001, Copyright © 2001 HyperTransport Technology Consortium.

PCT Search Report PCT/US03/34756, Int'l filing date Oct. 30, 2003, Search report Mailed Dec. 16, 2004.

U.S. Office Action mailed Jan. 4, 2006, from related U.S. Appl. No. 10/442,845.

U.S. Office Action mailed Sep. 9, 2005, from related U.S. Appl. No. 10/462,015.

U.S. Office Action mailed Sep. 9, 2005, from related U.S. Appl. No. 10/426,084.

Powell et al., "Reducing Set-Associative Cache Energy via Way-Prediction and Selective Direct-Mapping", © 2001 IEEE, p. 54-65.

Kim et al., "Power-aware Partitioned Cache Architecture", © 2001 ACM, p. 64-67.

U.S. Office Action mailed Oct. 20, 2005, from related U.S. Appl. No. 10/321,078.

U.S. Office Action mailed Oct. 5, 2005, from related U.S. Appl. No. 10/635,703.

* cited by examiner

Figure 7

| Coherence Directory 701 | | | |
|---|---|---|---|
| Memory Line 711 | State 713 | Dirty Data Owner 715 | Occupancy Vector 717 |
| Address 721 | Invalid | N/A | N/A |
| Address 731 | Invalid | N/A | N/A |
| Address 741 | Shared | N/A | Clusters 1,3 |
| Address 751 | Shared | N/A | Clusters 1, 2, 3, 4 |
| Address 761 | Owned | Cluster 4 | Cluster 2, 3, 4 |
| Address 771 | Owned | Cluster 2 | Cluster 2, 4 |
| Address 781 | Modified | Cluster 2 | N/A |
| Address 791 | Modified | Cluster 3 | N/A |
| ... | ... | ... | ... |

Figure 8

| Probe Filter Information 821 | Read Block (Read) 823 | Read Block Modify (Read/Write) 825 |
|---|---|---|
| Invalid 831 | Can use completion bit. Probe home cluster. (801) | Can use completion bit. Probe home cluster. (809) |
| Shared 833 | Can use completion bit. Probe home cluster. (803) | N/A (811) |
| Owned 835 | Can use completion bit. Probe remote cluster with line cached in owned state. (805) | N/A (813) |
| Modified 837 | Can use completion bit. Probe remote cluster with line cached in modified state. (807) | Can use completion bit. Probe remote cluster. (815) |

Figure 12

| | Read Block [Read] 1223 | Read Block Modify [Read/Write] 1225 |
|---|---|---|
| | Memory Controller Filter Information 1221 | |
| Invalid 1231 | Send request to target. (1201) | Send request to target. (1209) |
| Shared 1233 | Send request to target. (1203) | Send request to target. (1211) |
| Owned 1235 | Forward Probe To Owning Cluster. (1205) | Send request to target. (1213) |
| Modified 1237 | Forward Probe To Modified Cluster. (1207) | Forward Probe To Modified Cluster. (1215) |

METHODS AND APPARATUS FOR MANAGING PROBE REQUESTS

CROSS-REFERENCE TO RELATED APPLICATIONS

The present application is related to filed U.S. application Ser. No. 10/106,426 titled Methods And Apparatus For Speculative Probing At A Request Cluster, U.S. application Ser. No. 10/106,430 titled Methods And Apparatus For Speculative Probing With Early Completion And Delayed Request, and U.S. application Ser. No. 10/106,299 titled Methods And Apparatus For Speculative Probing With Early Completion And Early Request, the entireties of which are incorporated by reference herein for all purposes. The present application is also related to filed U.S. application Ser. Nos. 10/157,340, 10/145,439, 10/145,438, and 10/157,388 titled Methods And Apparatus For Responding To A Request Cluster by David B. Glasco, the entireties of which are incorporated by reference for all purposes. The present application is also related to concurrently filed U.S. application Ser. No. 10/288,347 with the same title and inventor, the entirety of which is incorporated by reference herein for all purposes.

BACKGROUND OF THE INVENTION

1. Field of the Invention

The present invention generally relates to accessing data in a multiple processor system. More specifically, the present invention provides techniques for improving data access efficiency while maintaining cache coherency in a multiple processor system having a multiple cluster architecture.

2. Description of Related Art

Data access in multiple processor systems can raise issues relating to cache coherency. Conventional multiple processor computer systems have processors coupled to a system memory through a shared bus. In order to optimize access to data in the system memory, individual processors are typically designed to work with cache memory. In one example, each processor has a cache that is loaded with data that the processor frequently accesses. The cache is read or written by a processor. However, cache coherency problems arise because multiple copies of the same data can co-exist in systems having multiple processors and multiple cache memories. For example, a frequently accessed data block corresponding to a memory line may be loaded into the cache of two different processors. In one example, if both processors attempt to write new values into the data block at the same time, different data values may result. One value may be written into the first cache while a different value is written into the second cache. A system might then be unable to determine what value to write through to system memory.

A variety of cache coherency mechanisms have been developed to address such problems in multiprocessor systems. One solution is to simply force all processor writes to go through to memory immediately and bypass the associated cache. The write requests can then be serialized before overwriting a system memory line. However, bypassing the cache significantly decreases efficiency gained by using a cache. Other cache coherency mechanisms have been developed for specific architectures. In a shared bus architecture, each processor checks or snoops on the bus to determine whether it can read or write a shared cache block. In one example, a processor only writes an object when it owns or has exclusive access to the object. Each corresponding cache object is then updated to allow processors access to the most recent version of the object.

Bus arbitration is used when both processors attempt to write the same shared data block in the same clock cycle. Bus arbitration logic decides which processor gets the bus first. Although, cache coherency mechanisms such as bus arbitration are effective, using a shared bus limits the number of processors that can be implemented in a single system with a single memory space.

Other multiprocessor schemes involve individual processor, cache, and memory systems connected to other processors, cache, and memory systems using a network backbone such as Ethernet or Token Ring. Multiprocessor schemes involving separate computer systems each with its own address space can avoid many cache coherency problems because each processor has its own associated memory and cache. When one processor wishes to access data on a remote computing system, communication is explicit. Messages are sent to move data to another processor and messages are received to accept data from another processor using standard network protocols such as TCP/IP. Multiprocessor systems using explicit communication including transactions such as sends and receives are referred to as systems using multiple private memories. By contrast, multiprocessor system using implicit communication including transactions such as loads and stores are referred to herein as using a single address space.

Multiprocessor schemes using separate computer systems allow more processors to be interconnected while minimizing cache coherency problems. However, it would take substantially more time to access data held by a remote processor using a network infrastructure than it would take to access data held by a processor coupled to a system bus. Furthermore, valuable network bandwidth would be consumed moving data to the proper processors. This can negatively impact both processor and network performance.

Performance limitations have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions. However, using a point-to-point architecture to connect multiple processors in a multiple cluster system sharing a single memory space presents its own problems.

Consequently, it is desirable to provide techniques for improving data access and cache coherency in systems having multiple clusters of multiple processors connected using point-to-point links.

SUMMARY OF THE INVENTION

According to the present invention, methods and apparatus are provided for increasing the efficiency of data access in a multiple processor, multiple cluster system. Mechanisms for reducing the number of transactions in a multiple cluster system are provided. In one example, memory controller filter information is used to probe a request or remote cluster while bypassing a home cluster memory controller.

In one embodiment, a computer system is provided. The computer system includes a home cluster having a first plurality of processors and a home cache coherence controller. The first plurality of processors and the home cache coherence controller are interconnected in a point-to-point architecture. The home cache coherence controller is configured to receive a probe request and determine if the probe request should bypass a memory controller associated with the home cluster.

In another embodiment, a method for managing probes is provided. A probe request is received at a home cache coherence controller in a home cluster. The home cluster includes a first plurality of processors and the home cache coherence controller. The first plurality of processors and the home cache coherence controller are interconnected in a point-to-point architecture. It is determined if the probe request should bypass a memory controller associated with the home cluster.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 7 is a diagrammatic representation showing a cache coherence directory.

FIG. 8 is a diagrammatic representation showing probe filter information that can be used to reduce the number of probes transmitted to various clusters.

FIG. 12 is a diagrammatic representation showing memory controller filter information.

DETAILED DESCRIPTION OF SPECIFIC EMBODIMENTS

Figure 1A:
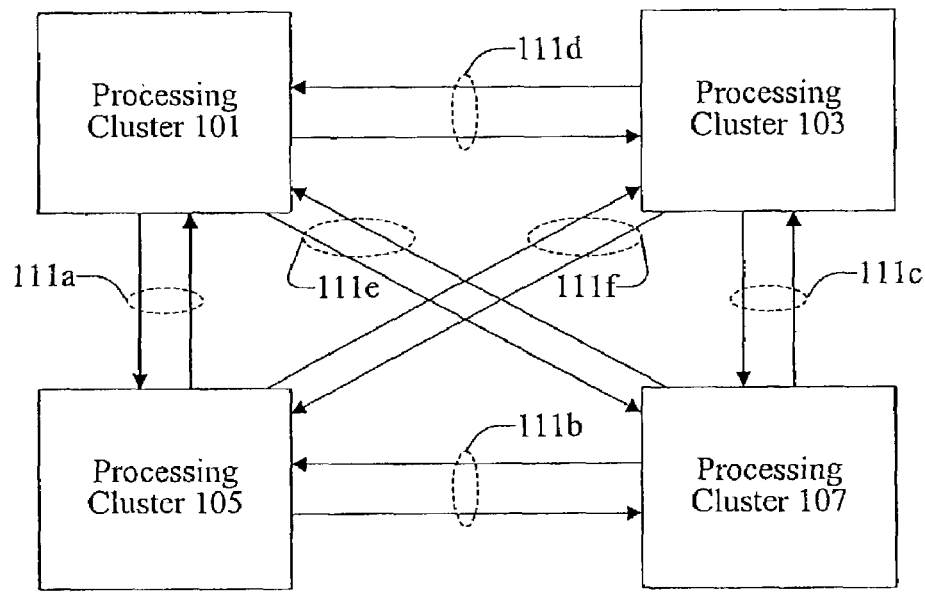
FIGS. 1A and 1B are diagrammatic representation depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller used to handle communications between clusters. In one embodiment, the point-to-point architecture used to connect processors are used to connect clusters as well.

By using a cache coherence controller, multiple cluster systems can be built using processors that may not necessarily support multiple clusters. Such a multiple cluster system can be built by using a cache coherence controller to represent non-local nodes in local transactions so that local nodes do not need to be aware of the existence of nodes outside of the local cluster. More detail on the cache coherence controller will be provided below.

In a single cluster system, cache coherency can be maintained by sending all data access requests through a serialization point. Any mechanism for ordering data access requests is referred to herein as a serialization point. One example of a serialization point is a memory controller. Various processors in the single cluster system send data access requests to the memory controller. In one example, the memory controller is configured to serialize or lock the data access requests so that only one data access request for a given memory line is allowed at any particular time. If another processor attempts to access the same memory line, the data access attempt is blocked until the memory line is unlocked. The memory controller allows cache coherency to be maintained in a multiple processor, single cluster system.

A serialization point can also be used in a multiple processor, multiple cluster system where the processors in the various clusters share a single address space. By using a single address space, internal point-to-point links can be used to significantly improve intercluster communication over traditional external network based multiple cluster systems. Various processors in various clusters send data access requests to a memory controller associated with a particular cluster such as a home cluster. The memory controller can similarly serialize all data requests from the different clusters. However, a serialization point in a multiple processor, multiple cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Although delay in intercluster transactions in an architecture using a shared memory space is significantly less than the delay in conventional message passing environments using external networks such as Ethernet or Token Ring, even minimal delay is a significant factor. In some applications, there may be millions of data access requests from a processor in a fraction of a second. Any delay can adversely impact processor performance.

According to various embodiments, probe management is used to increase the efficiency of accessing data in a multiple processor, multiple cluster system. A mechanism for eliciting a response from a node to maintain cache coherency in a system is referred to herein as a probe. In one example, a mechanism for snooping a cache is referred to as a probe. A response to a probe can be directed to the source or target of the initiating request. Any mechanism for filtering or reducing the number of probes and probe requests transmitted to various nodes is referred to herein as managing probes. In one example, managing probe entails characterizing a probe request to determine if a probe can be transmitted to a reduced number of entities.

In typical implementations, probe requests are sent to a memory controller that broadcasts probes to various nodes in a system. In such a system, no knowledge of the cache line state is known. All nodes in the system are probed and the request cluster receives a response from each node. In a system with a coherence directory, state information associated with various memory lines can be used to reduce the number of transactions. Any mechanism for maintaining state information associated with various memory lines is referred to herein as a coherence directory. A coherence directory typically includes information for memory lines in a local cluster that are cached in a remote cluster. According to various embodiments, a coherence directory is used to reduce the number of probes to remote quads by inferring the state of local caches. In other embodiments, a coherence directory is used to eliminate the transmission of a request to a memory controller in a home cluster.

FIG. 1A is a diagrammatic representation of one example of a multiple cluster, multiple processor system that can use the techniques of the present invention. Each processing cluster 101, 103, 105, and 107 can include a plurality of processors. The processing clusters 101, 103, 105, and 107 are connected to each other through point-to-point links 111*a–f*. In one embodiment, the multiple processors in the multiple cluster architecture shown in FIG. 1A share the same memory space. In this example, the point-to-point links 111*a–f* are internal system connections that are used in place of a traditional front-side bus to connect the multiple processors in the multiple clusters 101, 103, 105, and 107. The point-to-point links may support any point-to-point coherence protocol.

Figure 1B:
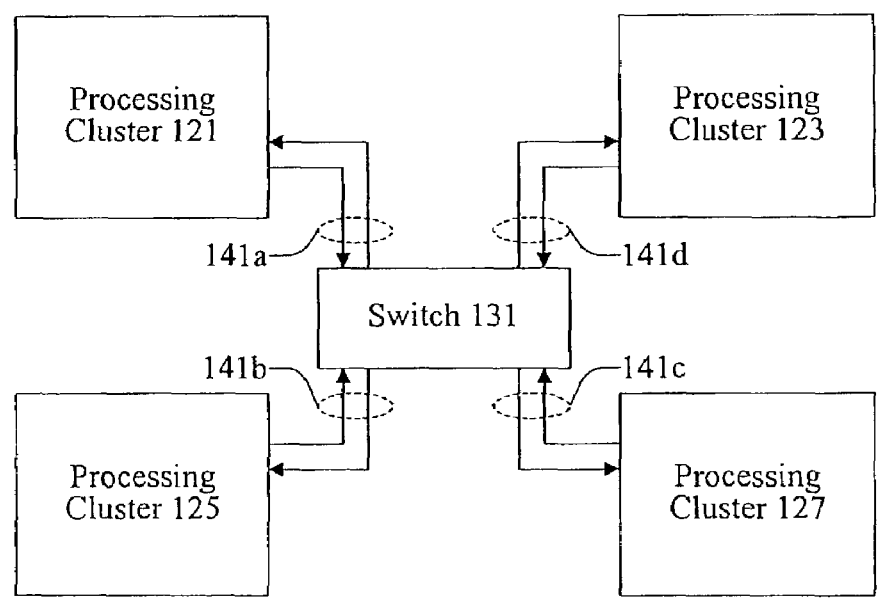

FIG. 1B is a diagrammatic representation of another example of a multiple cluster, multiple processor system that can use the techniques of the present invention. Each processing cluster 121, 123, 125, and 127 can be coupled to a switch 131 through point-to-point links 141*a–d*. It should be noted that using a switch and point-to-point links allows implementation with fewer point-to-point links when connecting multiple clusters in the system. A switch 131 can include a processor with a coherence protocol interface. According to various implementations, a multicluster system shown in FIG. 1A is expanded using a switch 131 as shown in FIG. 1B.

Figure 2:
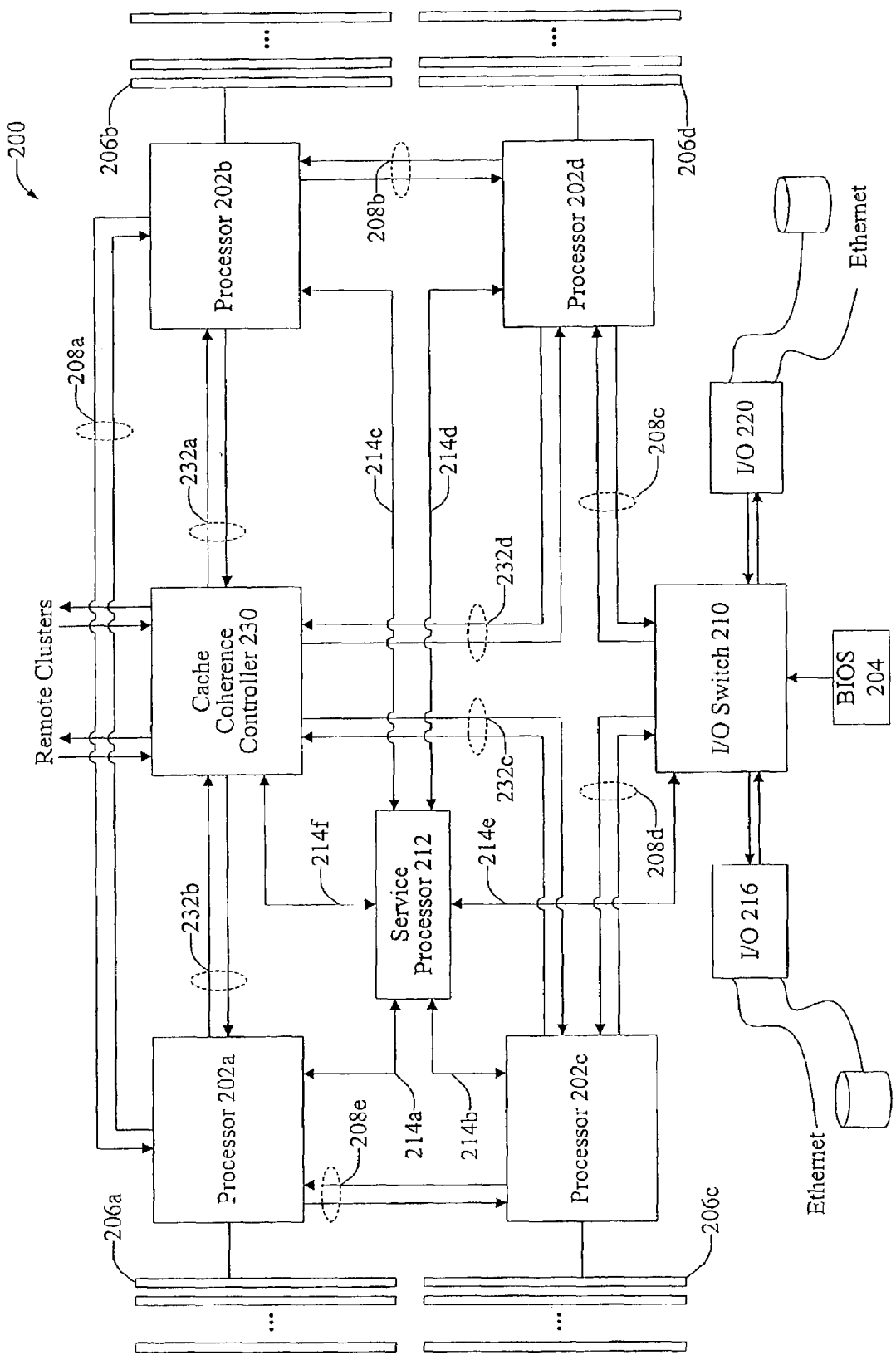
FIG. 2 is a diagrammatic representation of a cluster having a plurality of processors.

FIG. 2 is a diagrammatic representation of a multiple processor cluster, such as the cluster 101 shown in FIG. 1A. Cluster 200 includes processors 202*a–202d*, one or more Basic I/O systems (BIOS) 204, a memory subsystem comprising memory banks 206*a–206d*, point-to-point communication links 208*a–208e*, and a service processor 212. The point-to-point communication links are configured to allow interconnections between processors 202*a–202d*, I/O switch 210, and cache coherence controller 230. The service processor 212 is configured to allow communications with processors 202*a–202d*, I/O switch 210, and cache coherence controller 230 via a JTAG interface represented in FIG. 2 by links 214*a–214f*. It should be noted that other interfaces are supported. It should also be noted that in some implementations, a service processor is not included in multiple processor clusters. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein.

The processors 202*a–d* are also coupled to a cache coherence controller 230 through point-to-point links 232*a–d*. Any mechanism or apparatus that can be used to provide communication between multiple processor clusters while maintaining cache coherence is referred to herein as a cache coherence controller. The cache coherence controller 230 can be coupled to cache coherence controllers associated with other multiprocessor clusters. It should be noted that there can be more than one cache coherence controller in one cluster. The cache coherence controller 230 communicates with both processors 202*a–d* as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of server 200 will be assumed. For example, most of the resources shown in FIG. 2 are assumed to reside on a single electronic assembly. In addition, memory banks 206*a–206d* may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor which includes integrated chipset functions. The cache coherence controller 230 is an Application Specific Integrated Circuit (ASIC) supporting the local point-to-point coherence protocol. The cache coherence controller 230 can also be configured to handle a non-coherent protocol to allow communication with I/O devices. In one embodiment, the cache coherence controller 230 is a specially configured programmable chip such as a programmable logic device or a field programmable gate array.

Figure 3:
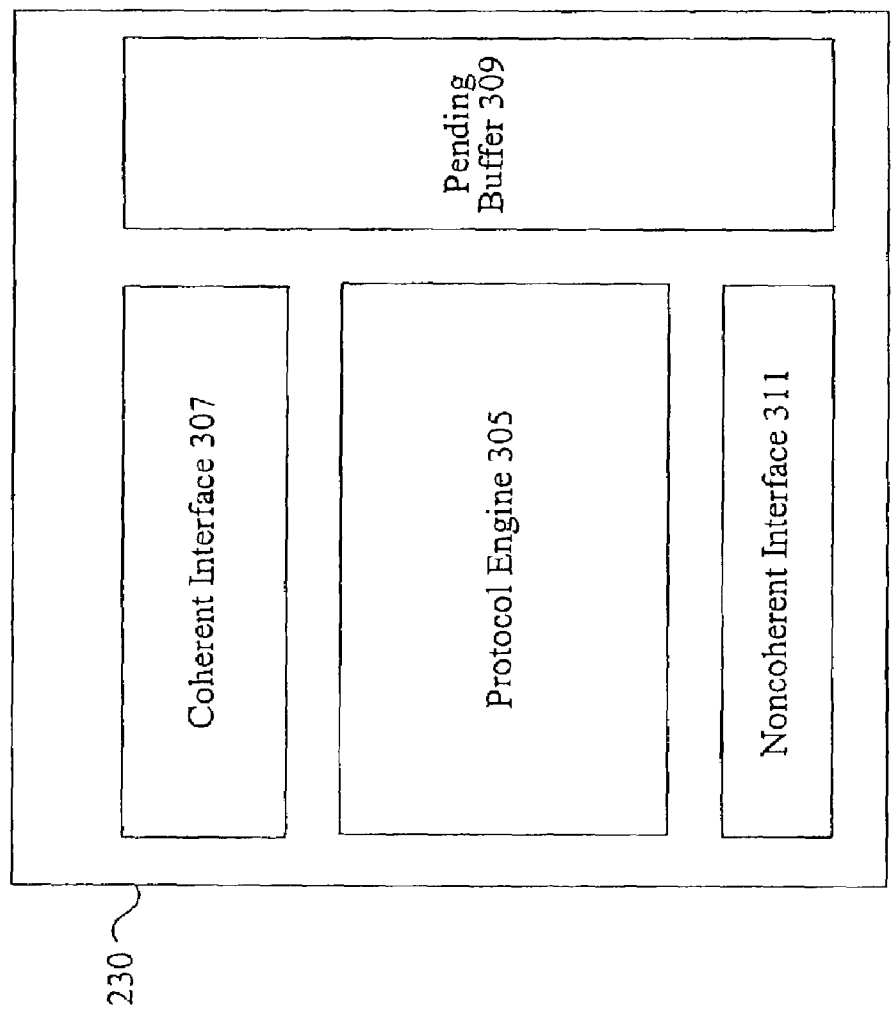
FIG. 3 is a diagrammatic representation of a cache coherence controller.

FIG. 3 is a diagrammatic representation of one example of a cache coherence controller 230. According to various embodiments, the cache coherence controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the cache coherence controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The cache coherence controller has an interface such as a coherent protocol interface 307 that allows the cache coherence controller to communicate with other processors in the cluster as well as external processor clusters. According to various embodiments, each interface 307 and 311 is implemented either as a full crossbar or as separate receive and transmit units using components such as multiplexers and buffers. The cache coherence controller can also include other interfaces such as a non-coherent protocol interface 311 for communicating with I/O devices. It should be noted, however, that the cache coherence controller 230 does not necessarily need to provide both coherent and non-coherent interfaces. It should also be noted that a cache coherence controller in one cluster can communicate with a cache coherence controller in another cluster.

Figure 4:
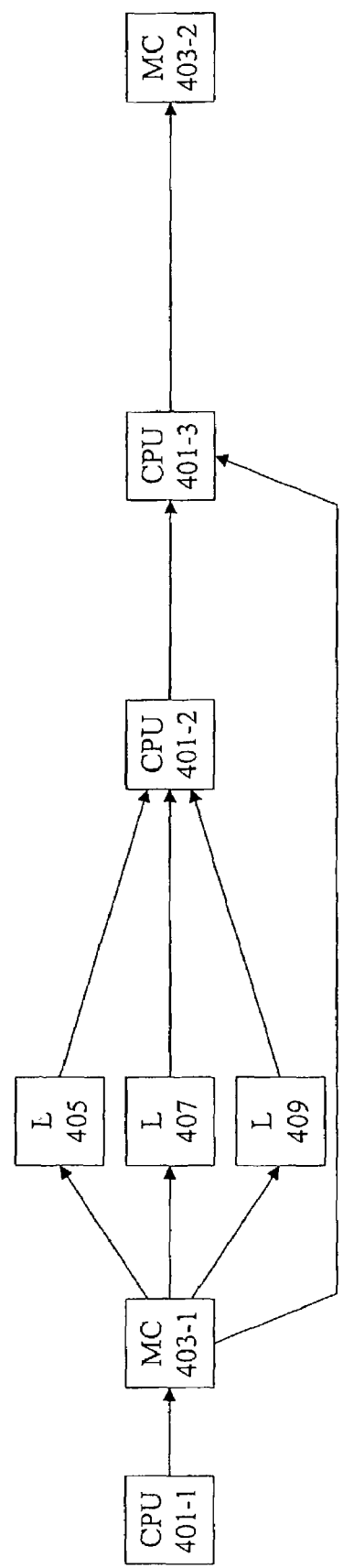
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. A processor 401-1 sends an access request such as a read memory line request to a memory controller 403-1. The memory controller 403-1 may be associated with this processor, another processor in the single cluster or may be a separate component such as an ASIC or specially configured Programmable Logic Device (PLD). To preserve cache coherence, only one processor is typically allowed to access a memory line corresponding to a shared address space at anyone given time. To prevent other processors from attempting to access the same memory line, the memory line can be locked by the memory controller 403-1. All other requests to the same memory line are blocked or queued. Access by another processor is typically only allowed when the memory controller 403-1 unlocks the memory line.

The memory controller 403-1 then sends probes to the local cache memories 405, 407, and 409 to determine cache states. The local cache memories 405, 407, and 409 then in turn send probe responses to the same processor 401-2. The memory controller 403-1 also sends an access response such as a read response to the same processor 401-3. The processor 401-3 can then send a done response to the memory controller 403-2 to allow the memory controller 403-2 to unlock the memory line for subsequent requests. It should be noted that CPU 401-1, CPU 401-2, and CPU 401-3 refer to the same processor.

FIGS. 5A–5D are diagrammatic representations depicting cache coherence controller operation. The use of a cache coherence controller in multiprocessor clusters allows the creation of a multiprocessor, multicluster coherent domain without affecting the functionality of local nodes such as processors and memory controllers in each cluster. In some instances, processors may only support a protocol that allows for a limited number of processors in a single cluster without allowing for multiple clusters. The cache coherence controller can be used to allow multiple clusters by making local processors believe that the non-local nodes are merely a single local node embodied in the cache coherence controller. In one example, the processors in a cluster do not need to be aware of processors in other clusters. Instead, the processors in the cluster communicate with the cache coherence controller as though the cache coherence controller were representing all non-local nodes.

It should be noted that nodes in a remote cluster will be referred to herein as non-local nodes or as remotes nodes. However, non-local nodes refer to nodes not in a request cluster generally and includes nodes in both a remote cluster and nodes in a home cluster. A cluster from which a data access or cache access request originates is referred to herein as a request cluster. A cluster containing a serialization point is referred to herein as a home cluster. Other clusters are referred to as remote clusters. The home cluster and the remote cluster are also referred to herein as non-local clusters.

Figure 5A:
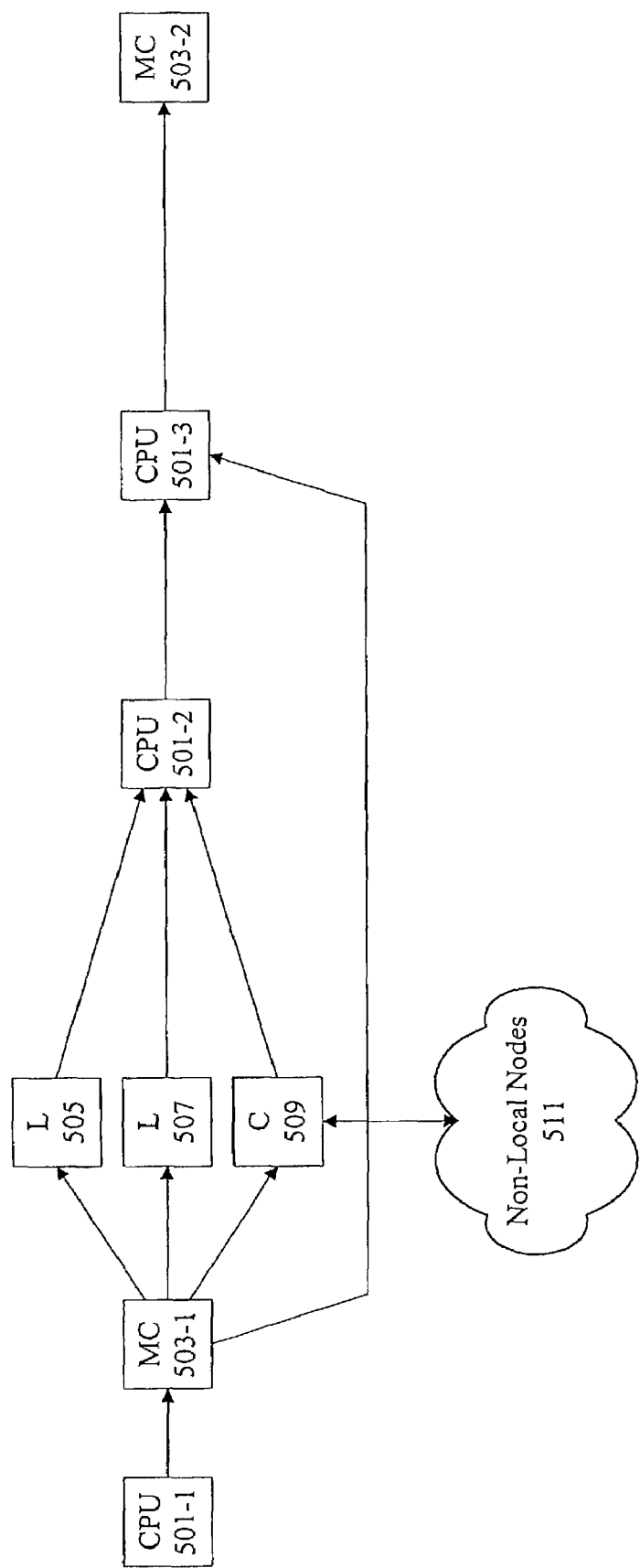
FIG. 5A-5D are diagrammatic representations showing cache coherence controller functionality.

FIG. 5A shows the cache coherence controller acting as an aggregate remote cache. When a processor 501-1 generates a data access request to a local memory controller 503-1, the cache coherence controller 509 accepts the probe from the local memory controller 503-1 and forwards it to non-local node portion 511. It should be noted that a coherence protocol can contain several types of messages. In one example, a coherence protocol includes four types of messages; data or cache access requests, probes, responses or probe responses, and data packets. Data or cache access requests usually target the home node memory controller. Probes are used to query each cache in the system. The probe packet can carry information that allows the caches to properly transition the cache state for a specified line. Responses are used to carry probe response information and to allow nodes to inform other nodes of the state of a given transaction. Data packets carry request data for both write requests and read responses.

According to various embodiments, the memory address resides at the local memory controller. As noted above, nodes including processors and cache coherence controllers outside of a local cluster are referred to herein as non-local nodes. The cache coherence controller 509 then accumulates the response from the non-local nodes and sends a single response in the same manner that local nodes associated with cache blocks 505 and 507 send a single response to processor 501-2. Local processors may expect a single probe response for every local node probed. The use of a cache coherence controller allows the local processors to operate without concern as to whether non-local nodes exist.

It should also be noted that components such as processor 501-1 and processor 501-2 refer herein to the same component at different points in time during a transaction sequence. For example, processor 501-1 can initiate a data access request and the same processor 501-2 can later receive probe responses resulting from the request.

Figure 5B:
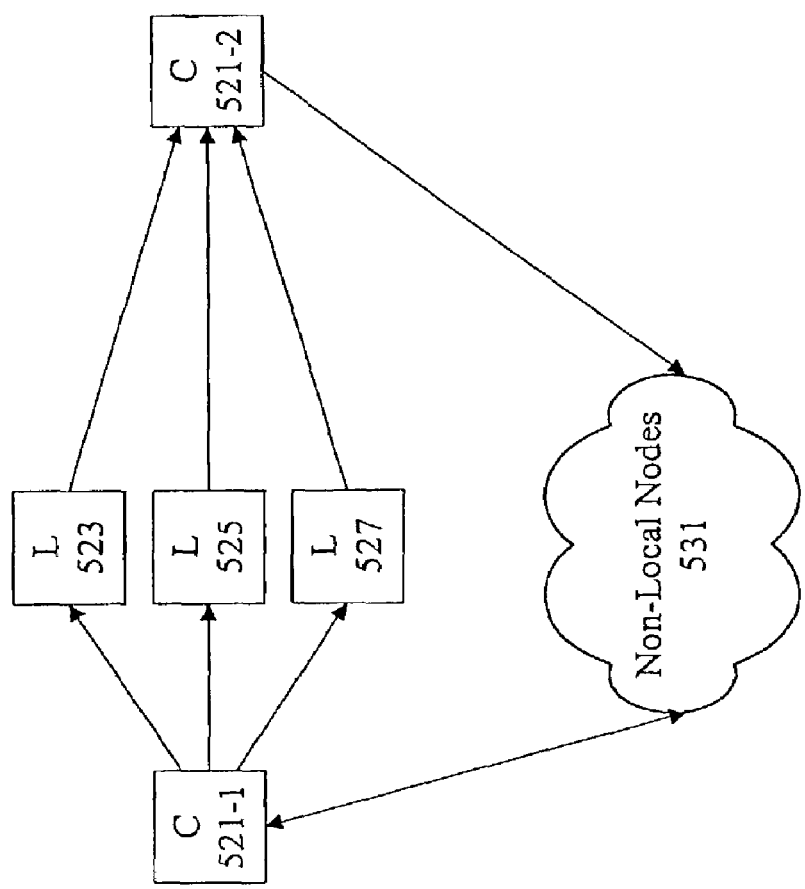

FIG. 5B shows the cache coherence controller acting as a probing agent pair. When the cache coherence controller 521-1 receives a probe from non-local nodes 531, the cache coherence controller 521-1 accepts the probe and forwards the probe to local nodes associated with cache blocks 523, 525, and 527. The cache coherence controller 521-2 then forwards a final response to the non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
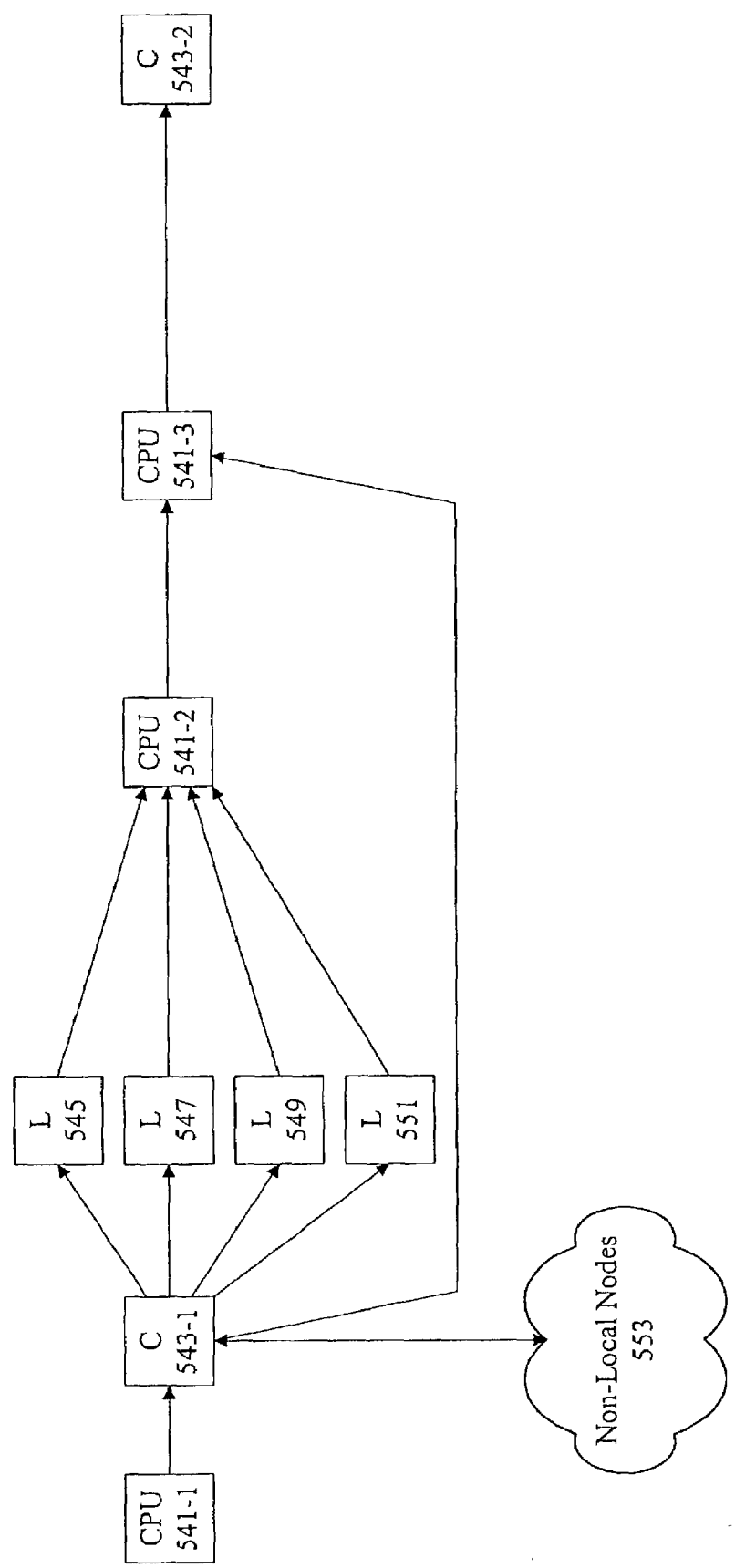

FIG. 5C shows the cache coherence controller acting as a remote memory. When a local processor 541-1 generates an access request that targets remote memory, the cache coherence controller 543-1 forwards the request to the non-local nodes 553. When the remote request specifies local probing, the cache coherence controller 543-1 generates probes to local nodes and the probed nodes provide responses to the processor 541-2. Once the cache coherence controller 543-1 has received data from the non-local node portion 553, it forwards a read response to the processor 541-3. The cache coherence controller also forwards the final response to the remote memory controller associated with non-local nodes 553.

Figure 5D:
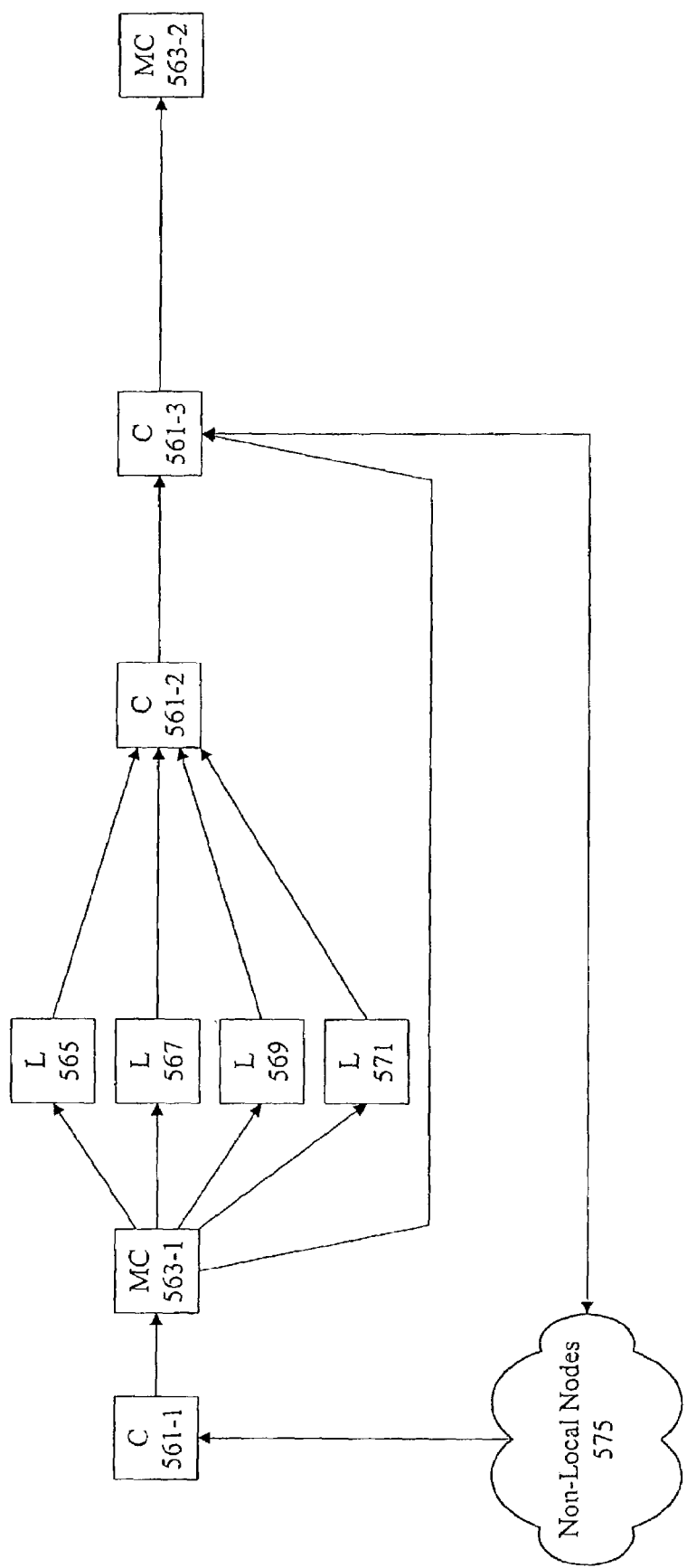

FIG. 5D shows the cache coherence controller acting as a remote processor. When the cache coherence controller 561-1 at a first cluster receives a request from a processor in a second cluster, the cache coherence controller acts as a first cluster processor on behalf of the second cluster processor. The cache coherence controller 561-1 accepts the request from portion 575 and forwards it to a memory controller 563-1. The cache coherence controller 561-2 then accumulates all probe responses as well as the data fetched and forwards the final response to the memory controller 563-2 as well as to non-local nodes 575.

By allowing the cache coherence controller to act as an aggregate remote cache, probing agent pair, remote memory, and remote processor, multiple cluster systems can be built using processors that may not necessarily support multiple clusters. The cache coherence controller can be used to represent non-local nodes in local transactions so that local nodes do not need to be aware of the existence of nodes outside of the local cluster.

Figure 6:
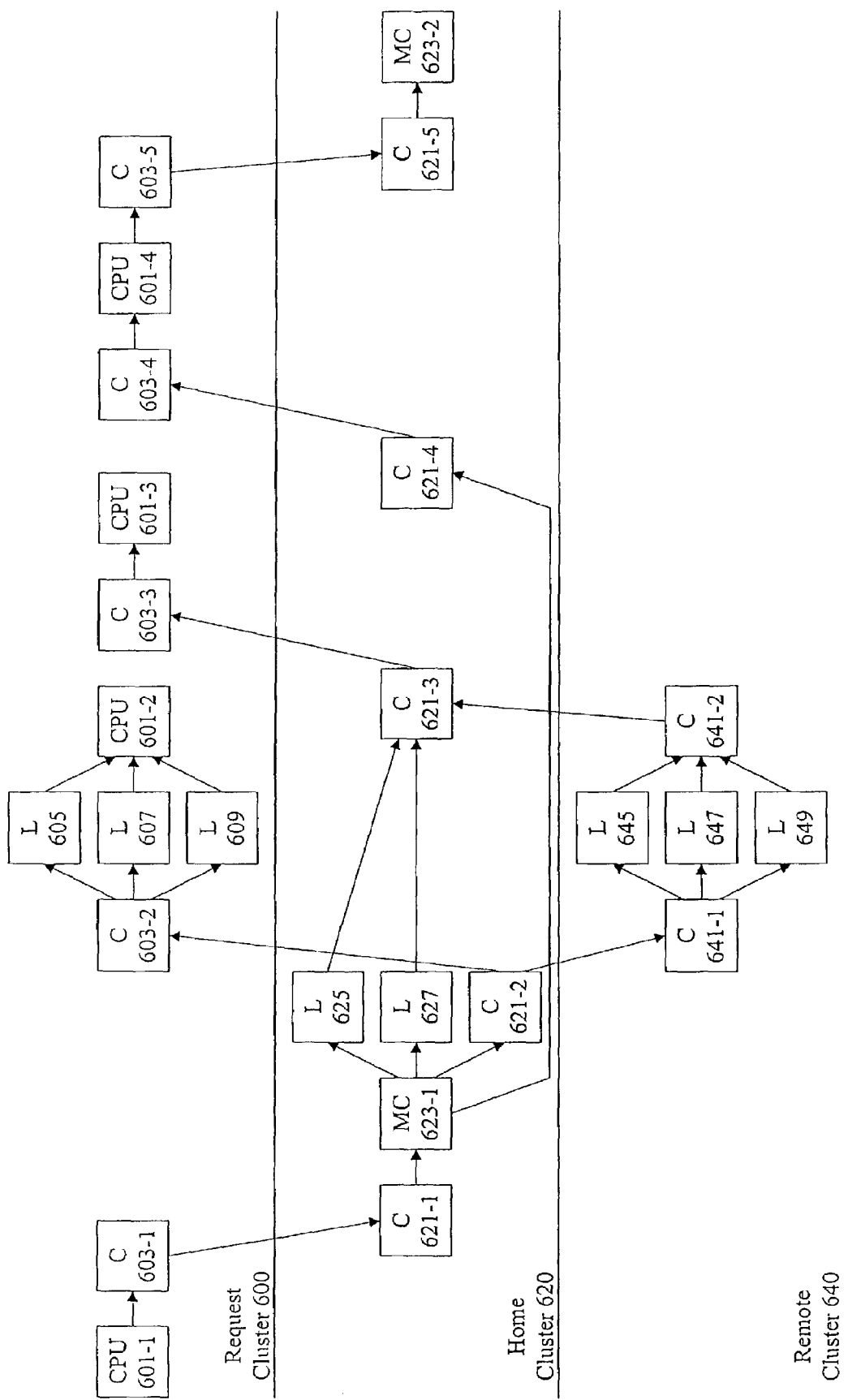
FIG. 6 is a diagrammatic representation depicting a transaction flow for a probe request with multiple probe responses.

FIG. 6 is a diagrammatic representation depicting the transactions for a data request from a local processor sent to a non-local cluster using a cache coherence controller. The multicluster system includes a request cluster 600, a home cluster 620, and a remote cluster 640. As noted above, the home cluster 620 and the remote cluster 640 as well as any other clusters excluding the request cluster 600 are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in a local cluster 600 sends a data access request such as a read request to a cache coherence controller 603-1. The cache coherence controller 603-1 tracks the transaction in the pending buffer of FIG. 3 and forwards the request to a cache coherence controller 621-1 in a home cluster 620. The cache coherence controller 621-1 at the home cluster 620 receives the access request and tracks the request in its pending buffer. In one example, information associated with the requests are stored in the pending buffer. The cache coherence controller 621-1 forwards the access request to a memory controller 623-1 also associated with the home cluster 620. At this point, the memory controller 623-1 locks the memory line associated with the request. In one example, the memory line is a unique address in the memory space shared by the multiple processors in the request cluster 600, home cluster 620, and the remote cluster 640. The memory controller 623-1 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple cluster architecture to be transparent to various local nodes. It should be noted that write requests can be handled as well. In write requests, the targeted memory controller gathers responses and sends the responses to the processor when gathering is complete.

The cache coherence controller 641-1 associated with the remote cluster 640 receives a probe from cache coherence controller 621-2 and probes local nodes associated with cache blocks 645, 647, and 649. Similarly, the cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to the processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at the home cluster 620 is now complete. Another processor can now access the unlocked memory line.

It should be noted that because the cache coherence controller 621-3 waits for remote cluster probe responses before sending a probe response to cache coherence controller 603-3, delay is introduced into the system. According to various embodiments, probe responses are gathered at cache coherence controller 603-3. By having remote clusters send probe responses through a home cluster, both home cluster probe responses and remote cluster probe responses can be delayed at the home cache coherence controller. In one example, remote cluster probe responses have to travel an additional hop in order to reach a request cluster. The latency for transmission of a probe response between a remote cluster and a request cluster may be substantially less than the latency for transmission of a probe response between a remote cluster and a request cluster through a home cluster. Home cluster probe responses are also delayed as a result of this added hop.

As will be appreciated by one of skill in the art, the specific transaction sequences involving requests, probes, and response messages can vary depending on the specific implementation. In one example, a cache coherence controller 621-3 may wait to receive a read response message from a memory controller 623-1 before transmitting both a probe response message and a read response message to a cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs, and remote memory as described with reference to FIGS. 5A–5D.

The cache coherence controller 621-1 at the home cluster 620 is acting as a remote processor. When the cache coherence controller receives a request from a request cluster processor, the cache coherence controller is directed to act as the requesting processor on behalf of the request cluster processor. In this case, the cache coherence controller 621-1 accepts a forwarded request from processor 601-1 and sends it to the memory controller 623-1, accumulates responses from all local nodes and the memory controller 623-1, and forwards the accumulated responses and data back to the requesting processor 601-3. The cache coherence controller 621-5 also forwards a source done to the local memory controller 623-2.

The cache coherence controller 603-1 at the request cluster 600 is acting as a remote memory. As remote memory, the cache coherence controller is designed to forward a request from a processor to a proper remote cluster and ensure that local nodes are probed. In this case, the cache coherence controller 603-1 forwards a probe to cache coherence controller 621-1 at a home cluster 620. Cache coherence controller 603-2 also probes local nodes 605, 607, and 609.

The cache coherence controller 641-1 at the request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, the cache coherence controller 641-1 sends a probe to local nodes associated with cache blocks 645, 647, and 649, gathers probe responses and sends the probe responses to cache coherence controller 621-3 at home cluster 620. Similarly, cache coherence controller 603-2 also acts as a probing agent pair at a request cluster 600. The cache coherence controller 603-2 forwards probe requests to local nodes including local nodes associated with cache blocks 605, 607, and 609.

The cache coherence controller 621-2 and 621-3 is also acting as an aggregate remote cache. The cache coherence controller 621-2 is responsible for accepting the probe from the memory controller 623-1 and forwarding the probe to the other processor clusters 600 and 640. More specifically, the cache coherence controller 621-2 forwards the probe to cache coherence controller 603-2 corresponding to request cluster 600 and to cache coherence controller 641-1 corresponding to remote cluster 640. As noted above, using a multiple cluster architecture may introduce delay as well as other undesirable elements such as increased traffic and processing overhead.

Probes are transmitted to all clusters in the multiple cluster system even though not all clusters need to be probed. For example, if a memory line associated with a probe request is invalid or absent from cache, it may not be necessary to probe all of the caches associated with the various clusters. In a system without a coherence directory, it is typically necessary to snoop all clusters. However, by using a coherence directory, the number of transactions in the system can be reduced by probing only a subset of the clusters in a system in order to minimize traffic and processing overhead.

By using a coherence directory, global memory line state information (with respect to each cluster) can be maintained and accessed by a memory controller or a cache coherence controller in a particular cluster. According to various embodiments, the coherence directory tracks and manages the distribution of probes as well as the receipt of responses. If coherence directory information indicates that probing of a specific cluster is not required, the probe to the specific cluster can be eliminated. In one example, a coherence directory indicates that probing of requesting and remote clusters is not necessary. A cache coherence controller in a home cluster probes local nodes without forwarding probes to the request and remote clusters. The cache coherence controller in the home cluster then sends a response to the request cluster after probe responses are received. However, in typical multiple cluster systems, a requesting cluster expects a predetermined number of responses from the various probed clusters. In one example, if the multiple cluster system includes four clusters, a request cluster would expect probe responses associated with nodes in all four clusters.

According to various embodiments, the techniques of the present invention provide a completion bit associated with a probe responses. The completion bit indicates to the requesting cluster that no other probe responses from other clusters should be expected. Any mechanisms for notifying a request cluster that no other probe responses should be expected from other clusters is referred to herein as a completion indicator. In one example, a completion indicator is a completion bit included in the response sent to a request cluster after local nodes are probed. In another example, a completion indicator is separate data transmitted to a request cluster. By using a coherence directory and a completion indicator, the number of transactions associated with probing various clusters can be reduced. For example, with reference to FIG. 6, probes to cache coherence controller 603-2 and cache coherence controller 641-1 can be eliminated. A single response with a completion indicator can be transmitted by cache coherence controller 621-4 to the request cluster 600.

FIG. 7 is one example of a coherence directory that can be used to allow management and filtering of probes. Various coherence directories are available. In one example, a full directory provides an entry for every memory line in a system. In this example, the coherence directory is maintained at the memory controller and is accessible by a cache coherence controller. However, in a system with a large amount of system memory, a full directory may not be efficient or practical. According to various embodiments, a sparse directory is provided with a limited number of entries associated with a selected set of memory lines. In one example, the coherence directory 701 includes state information 713, dirty data owner information 715, and an occupancy vector 717 associated with the memory lines 711. In some embodiments, the memory line states are modified, owned, shared, and invalid.

In the invalid state, a memory line is not currently available in cache associated with any remote cluster. In the shared state, a memory line may be present in more than one cache, but the memory line has not been modified in any of these caches. When a memory line is in the shared state, an occupancy vector 717 can be checked to determine what caches share the relevant data. An occupancy vector 717 may be implemented as an N-bit string, where each bit represents the availability of the data in the cache of N clusters. Any mechanism for tracking what clusters hold a copy of the relevant memory line in cache is referred to herein as an occupancy vector. The memory line with address 741 is in the shared state, and the occupancy vector 717 indicates that clusters 1 and 3 each have a copy of the shared memory line in cache.

In the modified state, a memory line has been modified and the modified copy exists in cache associated with a particular cluster. When a memory line is modified, dirty data owner information field 715 can be checked to determine the owner of the dirty data. Any mechanism for indicating what cluster owns a modified copy of the memory line in cache is referred to herein as a dirty data owner information field. In one example, the memory line associated with address 781 is modified, and the dirty data owner field 715 indicates that cluster 2 owns the memory line.

In the owned state, a dirty memory line is owned by a single cache but may be resident in multiple caches. It has been read by the owning cache, but has not been modified. In this case, the copy held in memory is stale. If the memory line is in the owned state, dirty data owner field 715 can be accessed to determine which cluster owns the dirty data. In one example, the memory line associated with address 761 is in the owned state and is owned by cluster 4. The occupancy vector 717 can also be checked to determine what other caches may have the relevant data. In this example, the occupancy vector 717 indicates that clusters 2, 3, and 4 each have a copy of the data associated with the memory line in cache.

Although the coherence directory 701 includes the four states of modified, owned, shared, and invalid, it should be noted that particular implementations may use a different set of states. In one example, a system may have the five states of modified, exclusive, owned, shared, and invalid. The techniques of the present invention can be used with a variety of different possible memory line states.

The coherence directory tracks the various transactions such as probe requests and responses in a multiple cluster system to determine when memory lines are added to the coherence directory, when memory lines are removed from the directory, and when information associated with each memory line is updated. By using the coherence directory, the techniques of the present invention recognize that the number of transactions such as probe requests can be reduced by managing or filtering probes that do not need to be sent to specific clusters.

FIG. 8 is a diagrammatic representation showing probe filter information that can be used to reduce the number of transactions in a multiple cluster system. Any criterion that can be used to reduce the number of clusters probed from a home cluster is referred to herein as probe filter information. Transactions such as probe requests can have a variety of characteristics. Some characteristics include whether the probe is a read block (read) 823 or a read block modify (read/write) 825. Other characteristics of the probe include the state of the memory line associated with the probe. In some examples, states include invalid 831, shared 833, owned 835, and modified 837. According to various embodiments, a coherence directory maintains information for memory lines in the local cluster that are cached in non-local clusters, where non-local clusters can include request and remote clusters.

If the state of the memory line associated with a probe is invalid 831 as indicated in the coherence directory, no copies of the memory line reside in other clusters. Consequently, only the home cluster needs to be probed and a completion bit can be used to indicate to a request cluster that the request cluster should expect only a single response from home cluster instead of a response from each of the clusters. If the memory line associated with the probe is in the shared state 833, and the transaction is a read transaction, only the home cluster needs to be probed and a completion bit can again be used to indicate to the request cluster that only a single response from home cluster should be expected as indicated in entry 803. It should be noted that the completed bit can not be used in entries 811 and 813.

For read transactions on owned memory lines, only the remote cluster with the line cached in the owned state needs to be probed. The remote cluster can transmit the response with a completion bit back to a request cluster. For transactions on modified memory lines, the probe can be sent to the remote cluster with the line cached in the modified state. Although transactions such as read block (read) and read block modify (read/write) are described, it should be noted that other transactions such as test and test and set are contemplated.

Figure 9:
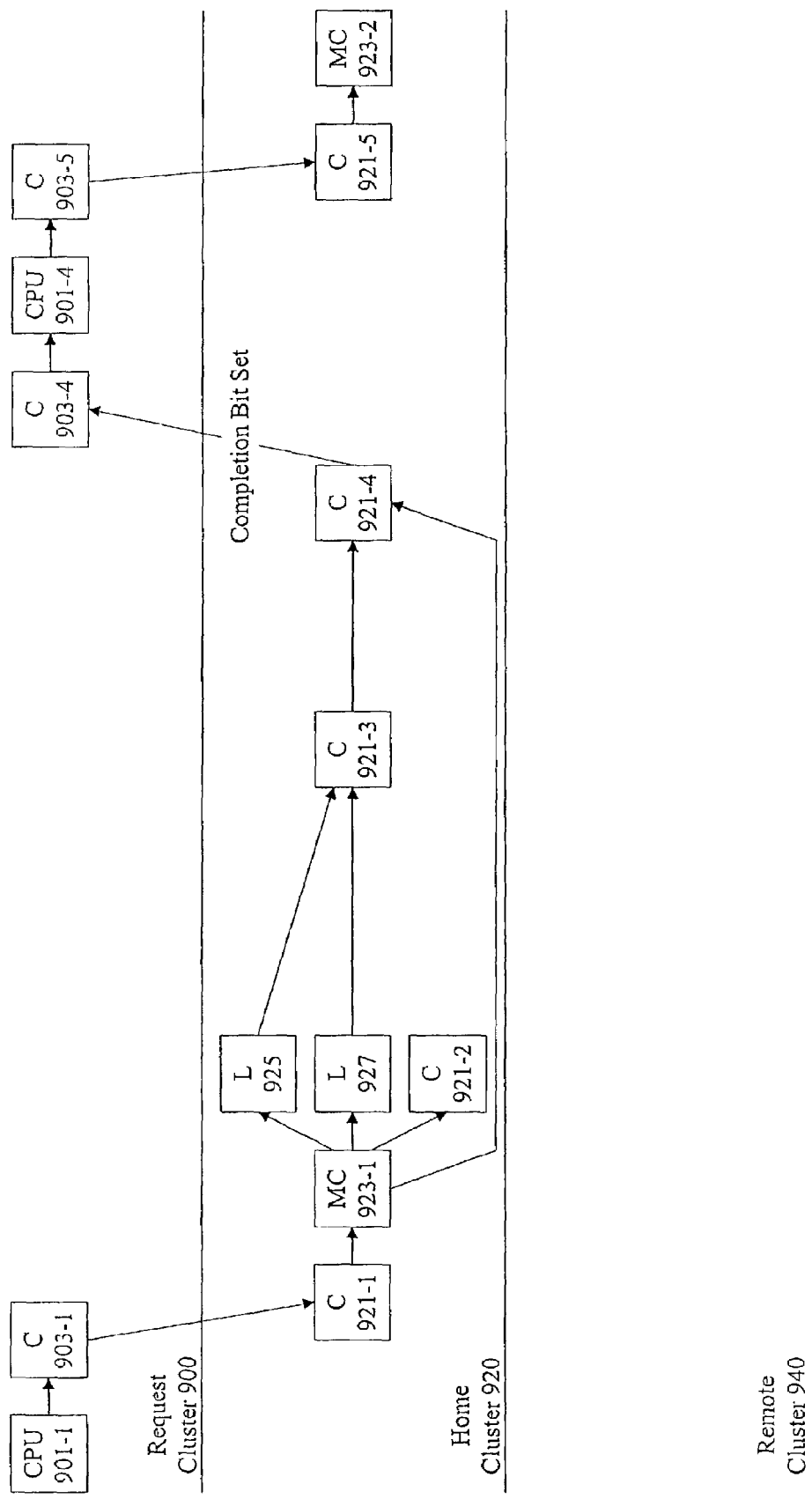
FIG. 9 is a diagrammatic representation showing a transaction flow for probing of a home cluster without probing of other clusters.

FIG. 9 is a diagrammatic representation depicting one example of transactions for probing only a home cluster as indicated in entries 801, 809, and 803 in FIG. 8. According to various embodiments, processor 901-1 in a local cluster 900 sends a data access request such as a read request to a cache coherence controller 903-1. The cache coherence controller 903-1 forwards the request to a cache coherence controller 921-1 in a home cluster 920. The cache coherence controller 921-1 at the home cluster 920 receives the access request and forwards the access request to a memory controller 923-1, which then probes local nodes 925, 927, and cache coherence controller 921-2. It should be noted that a cache coherency controller 921-1 is typically responsible for updating the coherence directory during various transactions. The cache coherence controller 921-2 determines characteristics associated with the probe from the memory controller 923-1 to determine whether remote probes are needed and whether a completion bit can be used. Here, the cache coherence controller 921-2 determines that no remote probes are needed and does not forward probes to the remote cluster 940 or to request cluster 900.

After cache coherence controller 921-4 receives the probe responses from local nodes as well as the read response from the memory controller 923-1, the response message with a completion indicator is transmitted to the request cluster. With the completion indicator, the request cluster does not wait for additional responses from other clusters. The coherence controller 903-4 forwards the response with the completion bit set to CPU 901-4. After receiving the response with the completion bit set, the CPU does not wait for additional responses from the local caches. CPU 901-4 forwards a source done message to cache coherence controller 903-5 to home cluster cache coherence controller 921-5, which can then perform updates of its coherence directory. The source done is then forwarded to memory controller 923-1.

Figure 10:
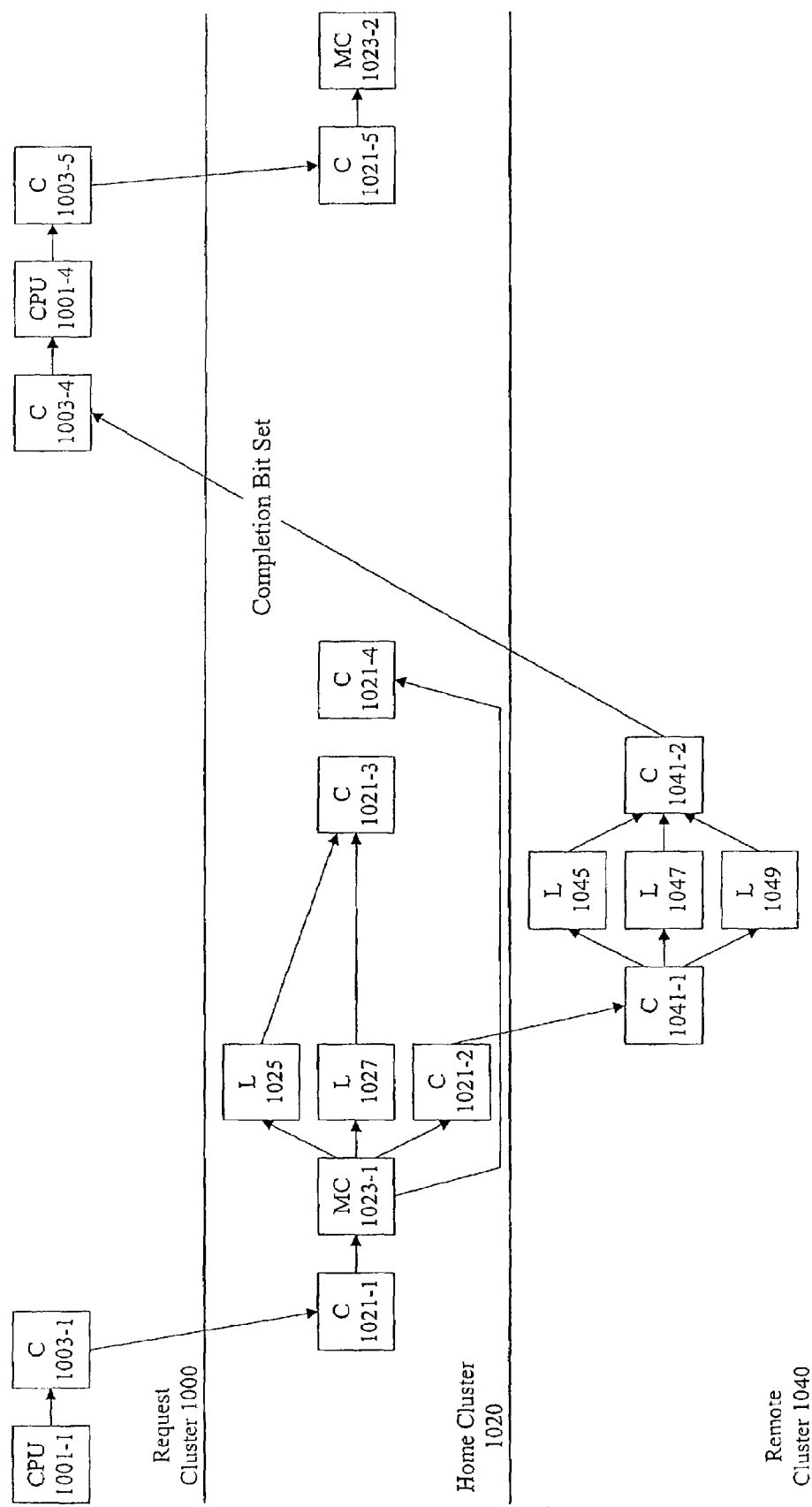
FIG. 10 is a diagrammatic representation showing a transaction flow for probing of a single remote cluster.

FIG. 9 shows one example of a sequence where only the home cluster needs to be probed. FIG. 10 shows one example of a sequence where only a single remote cluster needs to be probed. FIG. 10 is a diagrammatic representation depicting an example of transactions for probing a remote cluster as indicated in entries 805, 807, and 815 in FIG. 8. According to various embodiments, processor 1001-1 in a local cluster 1000 sends a data access request such as a read request to a cache coherence controller 1003-1. The cache coherence controller 1003-1 forwards the request to a cache coherence controller 1021-1 in a home cluster 1020. The cache coherence controller 1021-1 at the home cluster 1020 receives the access request and forwards the access request to a memory controller 1023-1, which then probes local nodes 1025, 1027, and cache coherence controller 1021-2. The cache coherence controller 1021-2 determines characteristics associated with the probe from the memory controller 1023-1 to determine whether remote probes are needed and whether a completion bit can be used. Here, the cache coherence controller 1021-2 determines that only a remote cluster needs to be probed and does not forward a probe to request cluster 1000.

After cache coherence controller 1021-4 receives the probes from local nodes as well as the read response from the memory controller 1023-1, a response message is not transmitted to the request cluster because the remote cluster is sending a response message with a completion indicator is transmitted to the request cluster. With the completion indicator, the request cluster does not wait for additional responses from other clusters. The response is forwarded to CPU 1001-4 and a source done message is sent from cache coherence controller 1003-5 to home cluster cache coherence controller 1021-5. With the completion bit set in the response to CPU 1001-4, it does not wait for any other local responses. After all responses from local nodes are received, the source done is then forwarded to memory controller 1023-1, which can then perform updates of its coherence directory.

Figure 11:
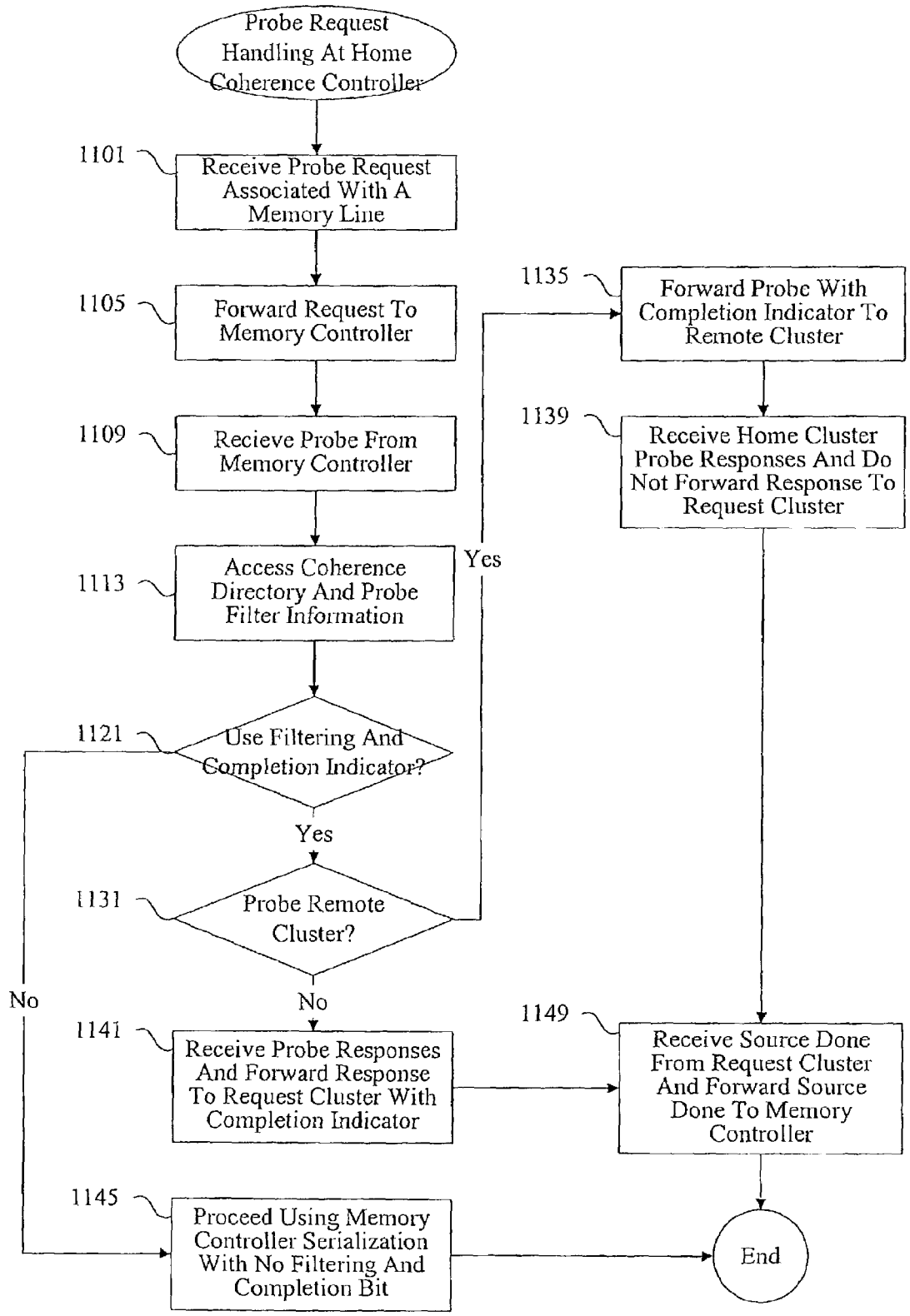
FIG. 11 is a flow process diagram showing the handling of a probe request with probe filter information.

FIG. 11 is a process flow diagram showing one example of a technique for handling probe requests at a home cache coherence controller. At 1101, a probe request associated with a memory line is received. At 1105, the cache coherence controller forwards the request to the memory controller. At 1109, the cache coherence controller receives a probe from the memory controller and accesses a coherence directory and probe filter information at 1113 to determine whether the number of probes to various clusters in the system can be reduced. At 1121, it is determined whether filtering and a completion indicator can be used. In one example, it is determined the filtering a completion indicator can be used by identifying the criteria specified in FIG. 8 and by accessing a coherence directory and shown in FIG. 7.

If a completion indicator can not be used, probes are broadcast to the various nodes with no filtering and no completion bit 1145. If filtering and a completion indicator can be used, it is determined at 1131 if a remote cluster should be probed. If a single remote cluster is the cluster that should be probed, the probe is forwarded with the completion indicator to the remote cluster at 1135. At 1139, home cluster probe responses are received but are not forwarded to the request cluster. The response is not sent to the request cluster from home cluster because a remote cluster is sending a response with a completion indicator to the request cluster.

At 1149, source done information is received from the request cluster and forwarded to the memory controller. If it is determined at 1131 that only the home cluster needs to be probed, then the cache coherence controller at 1141 does not send probes to any request or remote clusters and instead sends a response to the request cluster with a completion indicator. The cache coherence controller sends the response with the completion indicator after receiving home cluster probe responses. At 1149, the cache coherence controller at the home cluster receives source done information from the request cluster and forwards the source done information to the memory controller.

According to various embodiments, when the only cluster that needs to be probed is the home cluster, only the nodes in the home cluster are probed. No probes are transmitted to any request or remote cluster. However, when the only cluster that needs to be probed is a remote or request cluster, not only are the nodes in the remote cluster probed, but the nodes in the home cluster are probed as well. According to various embodiments, the techniques of the present invention provide that when only a remote or request cluster needs to be probed, the memory controller can sometimes be bypassed to allow probing of only the remote or request cluster. In one example, a probe is not forwarded to the home cluster memory controller and a probe is forwarded directly to the remote cluster from the home cluster cache coherence controller.

FIG. 12 is a diagrammatic representation showing exemplary memory controller filter information. Any criterion used to reduce the number of requests forwarded to a memory controller is referred to herein as memory controller filter information. Characteristics of a probe can again be analyzed when a cache coherence controller receives the probe from a request cluster. Transactions such as probe requests can have a variety of characteristics. Some characteristics include whether the probe is a read block (read) 1223 or a read block modify (read/write) 1225. Other characteristics of the probe include the state of the memory line associated with the probe. In some examples, states include invalid 1231, shared 1233, owned 1235, and modified 1237. When the state of the memory line associated with the probe is invalid 1231, no remote probes are required because not remote clusters have a copy of the memory line in cache. The cache coherence controller also has no knowledge of the home cluster cache state. The probe is consequently forwarded to the memory controller.

For read block transactions on a shared memory line 1203, there is no need to probe the remote clusters as the home cluster contains a valid copy of the memory line in either cache or the memory controller. Consequently the probe is forwarded to the memory controller. For read block modify transactions on shared memory lines 1211, the local node state is unknown and the probe is sent to the memory controller.

For read block transactions on an owned memory line 1205, there is no need to send a probe request to the target or probe local nodes as the owned state implies that the home cluster caches are invalid or shared. A probe is forwarded directly to the owning cluster to acquire the cached data. For read block write transactions on an owned memory line 1213, the local state is unknown and consequently the request is forwarded to the memory controller. When the state of the memory line associated with the request is modified 1237, there is no need to probe local nodes, as a modified state implies the home cluster state is invalid. A probe is forwarded to the cluster owning the memory line.

Figure 13:
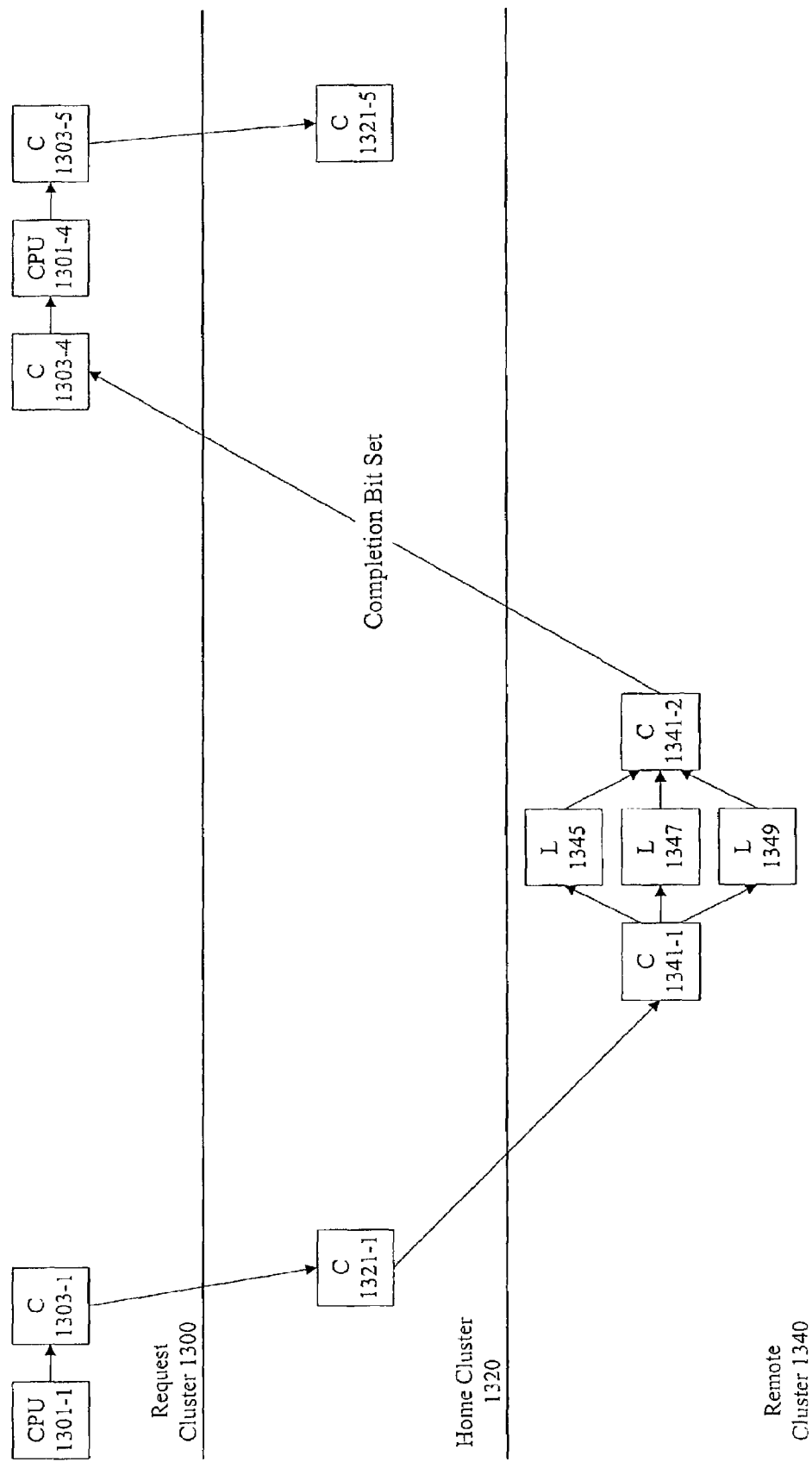
FIG. 13 is a diagrammatic representation showing a transaction flow for probing a single remote cluster without probing a home cluster.

FIG. 13 shows one example of a sequence where a probe does not need to be forwarded to the home cluster memory controller. According to various embodiments, processor 1301-1 in a local cluster 1300 sends a data access request such as a read request to a cache coherence controller 1303-1. The cache coherence controller 1303-1 forwards the request to a cache coherence controller 1321-1 in a home cluster 1320. The cache coherence controller 1321-1 at the home cluster 1320 receives the access request and determines whether the memory controller can be bypassed. Forwarding a probe to a remote or request, cluster without forwarding the probe to a memory controller is referred to herein as bypassing the memory controller. In one embodiment, the determination can be made by using memory controller filter information. If the probe characteristics fall within entries 1205, 1207, or 1215, the memory controller is bypassed and the probe is forwarded to cache coherence controller 1341-1 in the remote cluster 1340. In one example, the probe is forwarded with an indication that a completion bit should be used.

The cache coherence controller 1321-1 in the home cluster 1320 is acting as a serialization point in place of the memory controller to maintain cache coherency. Once it is determined that the memory controller can be bypassed, the cache coherence controller 1321-1 blocks all other incoming requests and outgoing probes until a final source done is received from the request cluster. The remote cluster cache coherence controller 1341-1 probes remote cluster nodes and sends a response with a completion indicator to the request cluster 1300. The response is forwarded to CPU 1301-4 and a source done message is sent from cache coherence controller 1303-5 to home cluster cache coherence controller 1321-5. The source done is not forwarded to the memory controller, because the memory controller never processed the transaction.

Figure 14:
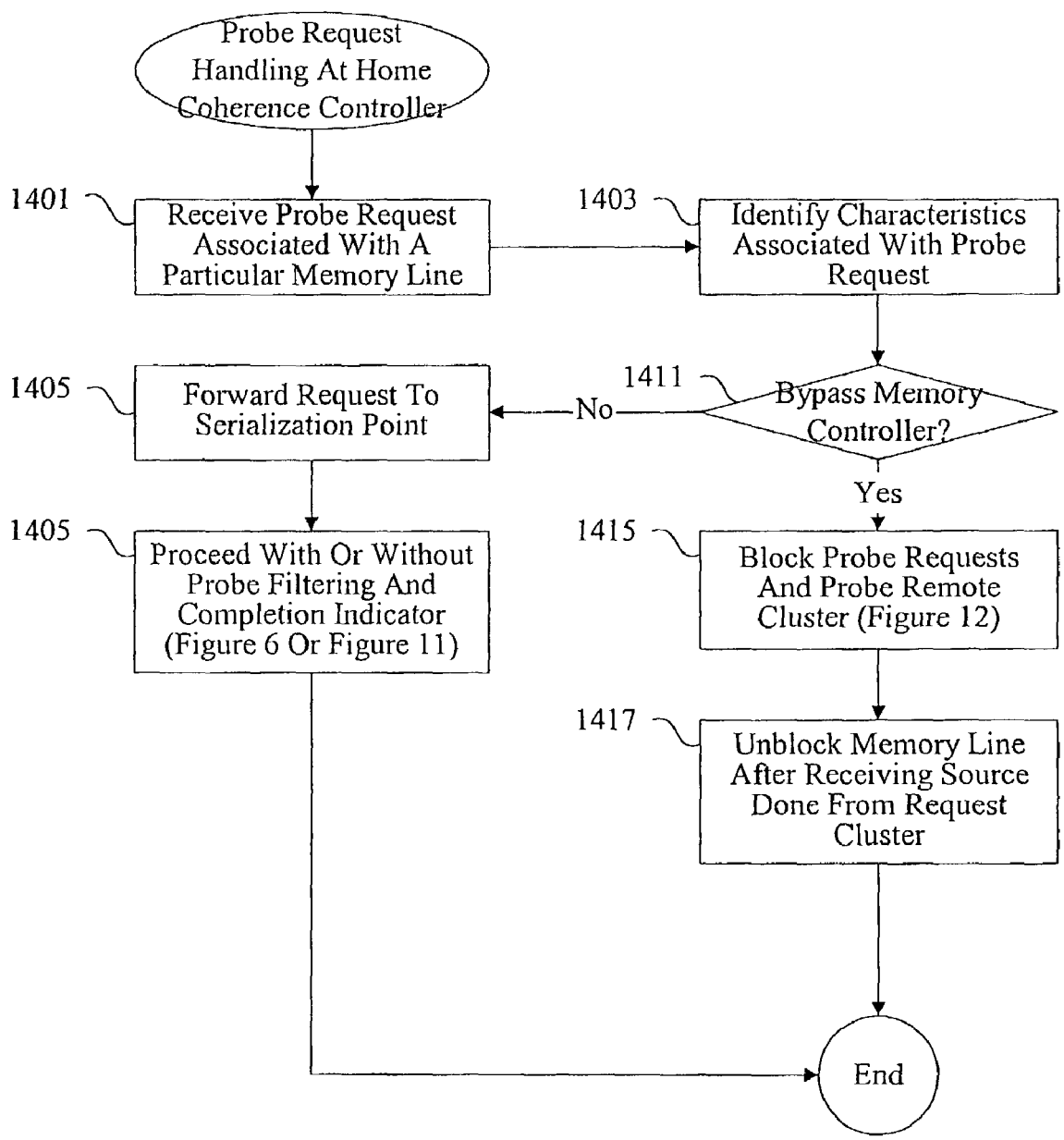
FIG. 14 is a flow process diagram showing the handling of a probe request at a home cluster cache coherence controller using memory controller filter information.

FIG. 14 is a flow process diagram showing probe request handling at a home cache coherence controller using memory controller filter information. At 1401, a probe request associated with a particular memory line is received. At 1403, characteristics associated with the probe request are identified. At 1411, it is determined if the memory controller can be bypassed. According to various embodiments, memory controller filter information shown in FIG. 12 is used to determine whether a memory controller can be bypassed. If it is determined that a memory controller can be bypassed, probe requests associated with the same memory line are blocked at 1415 and a probe is sent to a remote or a request cluster. At 1417, the memory line is unblocked after receiving a source done from the request cluster. If it is determined at 1411 that a memory controller can not be bypassed, the probe request is forwarded to a serialization point 1405. The transaction sequence can then proceed with or without probe filtering and a completion indicator as shown in 1109 of FIG. 11.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster. Therefore, the scope of the invention should be determined with reference to the appended claims.

What is claimed is:

1. A computer system, comprising:
a home cluster including a first plurality of processors and a home cache coherence controller, the first plurality of processors and the home cache coherence controller interconnected in a point-to-point architecture;
wherein the home cache coherence controller is configured to receive a probe request and determine if the probe request should bypass a memory controller associated with the home cluster, wherein the memory controller is bypassed by forwarding the probe directly to a remote cluster from the home cluster cache coherence controller, the remote cluster comprising a second plurality of processors interconnected in a point-to-point architecture.

2. The computer system of claim 1, wherein the probe request is associated with a particular memory line.

3. The computer system of claim 2, wherein the cache coherence controller is further configured to block subsequent probe requests associated with the particular memory line until a transaction complete indicator is received from a request cluster.

4. The computer system of claim 3, wherein the transaction complete indicator is a source done message from the home cache coherence controller.

5. The computer system of claim 1, wherein the home cache coherence controller is configured to determine if the probe request should bypass the memory controller by identifying characteristics associated with the probe request.

6. The computer system of claim 5, wherein the probe request should bypass the memory controller if a memory line associated with the probe request is in the modified state.

7. The computer system of claim 6, wherein the probe request should bypass the memory controller if a memory line associated with the probe request is in the owned state and the probe request is a read request.

8. The computer system of claim 7, wherein the probe request should not bypass the memory controller if a memory line associated with the probe request is in the invalid or shared states.

9. The computer system of claim 7, wherein the probe request should not bypass the memory controller if a memory line associated with the probe request is in the owned state and the probe request is a read/write request.

10. The computer system of claim 7, wherein the home cache coherence controller determines that the probe request should bypass the memory controller by using memory controller filter information associated with a cache coherence directory.

11. The computer system of claim 10, wherein the cache coherence directory identifies the state of a plurality of memory lines.

12. The computer system of claim 11, wherein the characteristics associated with the probe request include whether the probe request is a read or a read/write request.

13. A method for managing probes, the method comprising:
   receiving a probe request at a home cache coherence controller in a home cluster, the home cluster including a first plurality of processors and the home cache coherence controller, the first plurality of processors and the home cache coherence controller interconnected in a point-to-point architecture;
   determining if the probe request should bypass a memory controller associated with the home cluster, wherein the memory controller is bypassed by forwarding the probe directly to a remote cluster from the home cluster cache coherence controller, the remote cluster comprising a second plurality of processors interconnected in a point-to-point architecture.

14. The method of claim 13, wherein the probe request is associated with a particular memory line.

15. The method of claim 14, wherein cache coherence controller is further configured to block subsequent probe requests associated with the particular memory line until a transaction complete indicator is received from a request cluster.

16. The method of claim 15, wherein the transaction complete indicator is a source done message from the home cache coherence controller.

17. An apparatus for managing probes, the apparatus comprising:
   means for receiving a probe request at a home cache coherence controller in a home cluster, the home cluster including a first plurality of processors and the home cache coherence controller, the first plurality of processors and the home cache coherence controller interconnected in a point-to-point architecture;
   means for determining if the probe request should bypass a memory controller associated with the home cluster, wherein the memory controller is bypassed by forwarding the probe directly to a remote cluster from the home cluster cache coherence controller, the remote cluster comprising a second plurality of processors interconnected in a point-to-point architecture.

18. The apparatus of claim 17, wherein the probe request is associated with a particular memory line.

19. The apparatus of claim 18, wherein cache coherence controller is further configured to block subsequent probe requests associated with the particular memory line until a transaction complete indicator is received from a request cluster.

20. The apparatus of claim 19, wherein the transaction complete indicator is a source done message from the home cache coherence controller.

* * * * *